United States Patent [19]
Hollnagel

[11] Patent Number: 5,988,706
[45] Date of Patent: *Nov. 23, 1999

[54] TUBE FOR CONNECT TO FEMALE SOCKET

[76] Inventor: Harold E. Hollnagel, 9479 N. Riverbend Ct., Milwaukee, Wis. 53217

[*] Notice: This patent is subject to a terminal disclaimer.

[21] Appl. No.: 09/107,609

[22] Filed: Jun. 30, 1998

Related U.S. Application Data

[60] Division of application No. 08/911,540, Aug. 14, 1997, Pat. No. 5,803,512, which is a continuation-in-part of application No. 08/621,110, Mar. 22, 1996, Pat. No. 5,718,463, which is a continuation-in-part of application No. 08/527,759, Sep. 13, 1995, Pat. No. 5,730,400.

[51] Int. Cl.$^6$ ..................................................... F16L 37/12
[52] U.S. Cl. ........................... 285/319; 285/308; 285/351
[58] Field of Search ..................................... 285/319, 351, 285/86, 84, 308

[56] References Cited

U.S. PATENT DOCUMENTS

| | | |
|---|---|---|
| 3,711,125 | 1/1973 | Dehar . |
| 3,826,523 | 7/1974 | Eschbaugh . |
| 4,036,515 | 7/1977 | Karcher et al. . |
| 4,681,351 | 7/1987 | Bartholomew . |
| 4,778,203 | 10/1988 | Bartholomew ........................... 285/319 |
| 5,718,463 | 2/1998 | Hollnagel ................................ 285/319 |
| 5,765,877 | 6/1998 | Sakane et al. ........................... 285/319 |
| 5,803,512 | 9/1998 | Hollnagel ................................ 285/319 |
| 5,806,898 | 9/1998 | Hollnagel .................................. 285/86 |

Primary Examiner—Chuck Y. Mah
Assistant Examiner—Alison K. Pickard
Attorney, Agent, or Firm—Howard & Howard

[57] ABSTRACT

A tube (34) for disposition in a socket member (12) is characterized by having an end disposed in a socket member (12) and presenting a radially extending projection (38) and presenting an enlarged end (40) extending radially outwardly with the projection (38) from the remainder of the tube (34) and spaced from the projection (38) to define a saddle between the enlarged end (40) and the projection (38) for receiving a seal (42). The enlarged end (40) of the tube (34) is seated against a tube seat (24) of the socket member (12) and the enlarged end (40) and the projection (38) fit snugly within the socket member (12). The socket member (12) presents a radially extending shoulder and a quick connect member has an abutment (48) biased radially outwardly into a locked position in radial overlapping engagement with the shoulder to retain the tube (34) in the socket member (12) and moveable radially inwardly to a release position wherein the abutment (48) clears the shoulder to axially remove the quick connect member from the socket member (12) to remove the tube (34) from the socket member (12).

3 Claims, 3 Drawing Sheets

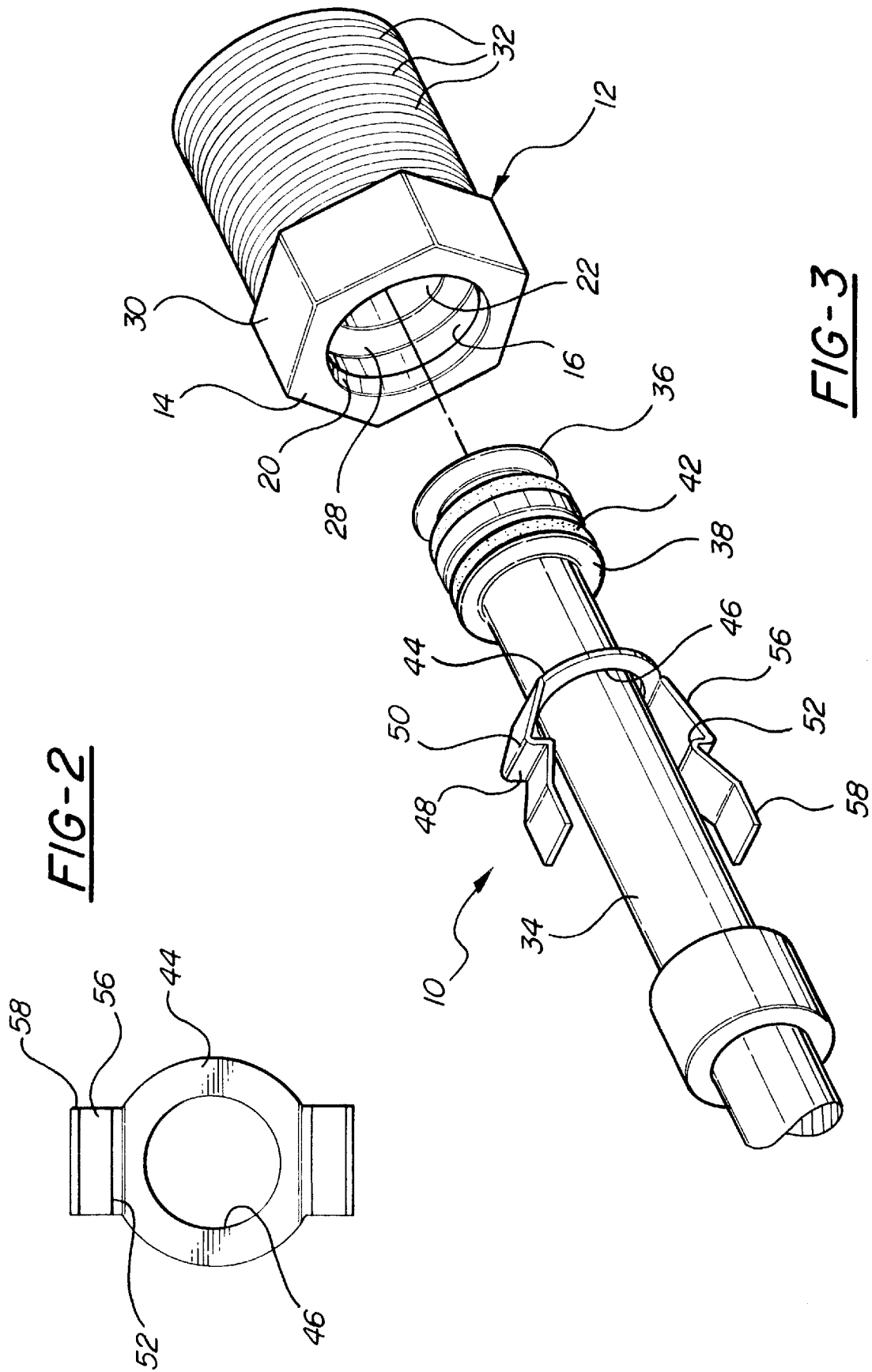

TUBE FOR CONNECT TO FEMALE SOCKET

RELATED APPLICATION

This application is a divisional of application Ser. No. 08/911,540 filed Aug. 14, 1997, now U.S. Pat. No. 5,803,512 issued Sep. 8, 1998, which is a continuation-in-part of application Ser. No. 08/621,110 filed Mar. 22, 1996, now U.S. Pat. No. 5,718,463 issued Feb. 17, 1998, which is a continuation-in-part of application Ser. No. 08/527,759 filed Sep. 13, 1995, now abandoned.

BACKGROUND OF THE INVENTION

1. Field of the Invention

The subject invention relates to a quick connect assembly for connecting a fluid conveying tube in a female socket in a member in fluid communication with the tube.

2. Description of the Prior Art

The art of coupling or connecting a fluid tube to a female socket or receptacle is highly developed and therefore includes a wide variety of assemblies. There is, however, a constant need to simplify the assembly and the manufacturing time and expense and to provide alternative constructions. Examples of such assemblies are disclosed in U.S. Pat. Nos. 3,711,125 to Dehar and 3,826,523 to Eschbaugh. The Dehar assembly, in addition to bending of metal to form the quick connect member, also requires a secondary piercing operation in the arms and a specially shaped seal between the end of the tube and the socket. The Eschbaugh assembly requires a relatively close tolerance fit between the quick connect member and the interior of the socket and relatively long arms requiring more metal.

SUMMARY OF THE INVENTION AND ADVANTAGES

A tube for quick connect assembly comprising a tube having an enlarged end for being seated against a tube seat of a socket member and a radially extending projection extending radially outwardly with the enlarged end from the remainder of the tube. The enlarged end is spaced from the projection to define a saddle between the enlarged end and the projection for receiving a seal in the saddle to seal the tube.

Accordingly, the subject invention provides a very specific quick connect assembly with a very specific tube shape which is easily fabricated with a minimum of operations.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is an end view of the quick connect member of FIG. 1;

FIG. 3 is an exploded perspective view of the embodiment of FIG. 1; and

DETAILED DESCRIPTION OF THE PREFERRED EMBODIMENT

Figure 1:
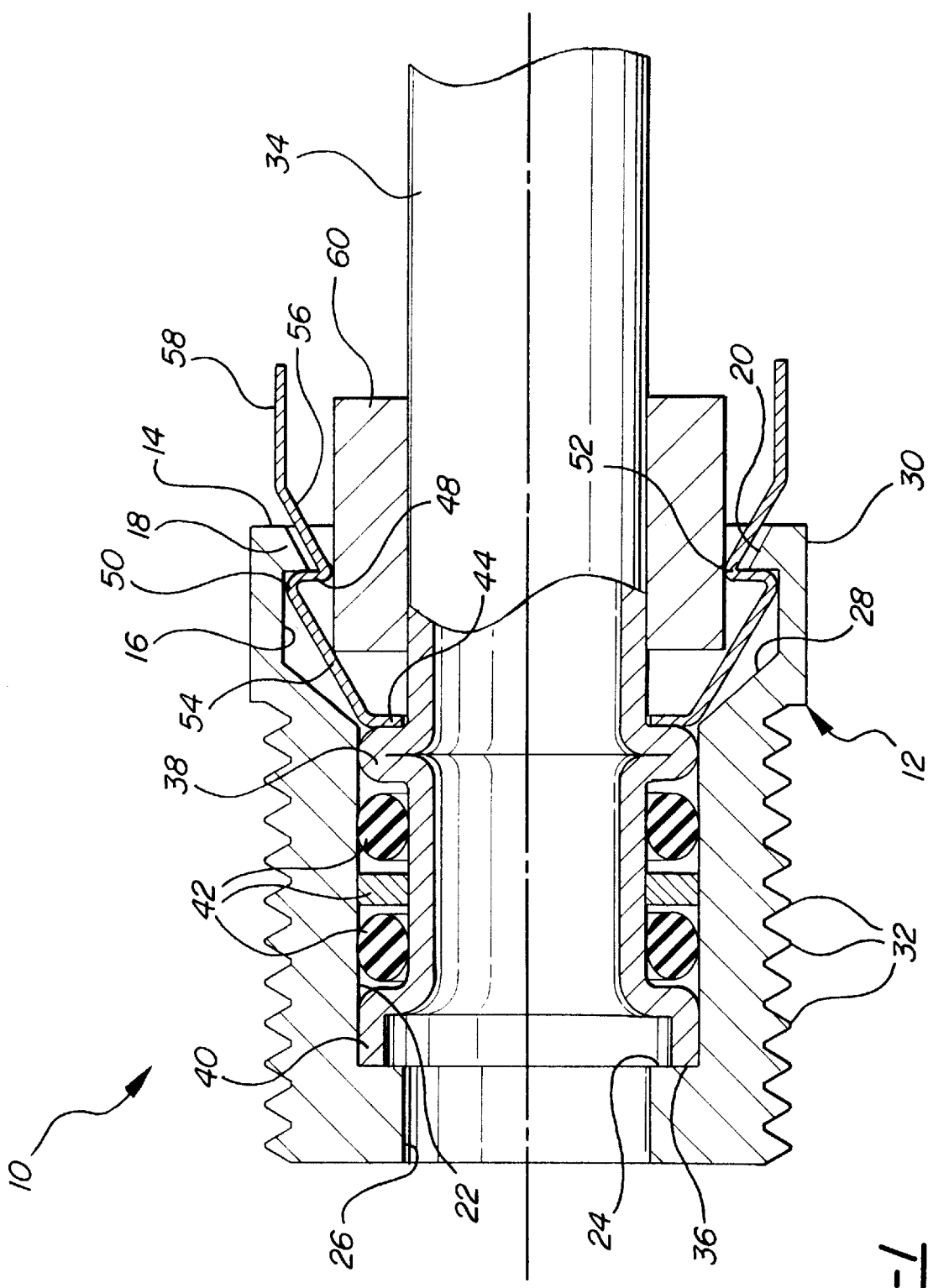
FIG. 1 is a fragmentary cross sectional view of a first preferred embodiment of the subject invention.

Referring to the Figures, wherein like numerals indicate like or corresponding parts throughout the several views, a first embodiment of a tube quick connect assembly is generally shown at 10 in FIGS. 1 through 3.

The assembly 10 comprises a socket member generally indicated at 12 and defining a female socket. More specifically, the socket member 12 has an entry end 14 and an annular groove 16 is disposed adjacent the entry end 14 to define an inwardly extending annular flange 18. The flange 18 presents a conical relief 20. In other words, the inwardly extending radial flange 18 terminates in a tapered or conical relief 20. The inwardly extending annular flange 18 and the groove 16 define a radially extending shoulder. The socket member 12 includes a tube counterbore 22 presenting a radial tube seat 24 adjacent a bore 26 in the male end of the socket member 12. The shoulder is therefore defined by the annular groove 16 in the socket member 12 and is of a larger diameter than the counterbore 22.

The socket member 12 also presents a conical surface 28 extending between the counterbore 22 and the annular groove 16. The socket member 12 includes a hexagonal head 30 disposed about the entry end 14 and a threaded exterior presenting threads 32 extending from the hexagonal head 30 to the male end of the socket member 12.

The socket member 12 establishes fluid communication between a port (not shown) into which it is threaded and a tube 34. The tube 34 has an end 36 disposed in the socket member 12 and presents a radially extending projection 38. The end of the tube 34 is seated against the tube seat 24. More specifically, the end of the tube 34 presents an enlarged end 40 extending radially outwardly coextensively with the projection 38 from the remainder of the tube 34. The radially enlarged end 40 is axially spaced from the projection 38 to define a saddle between the enlarged end 40 and the projection 38, the saddle being of the same diameter as the main portion of the tube 34. The enlarged end 40 and the projection 38 are of a larger diameter and fit snugly, i.e., closely, within the counterbore 22 and a seal 42 is disposed in the saddle to seal the tube 34 with the counterbore 22. In the embodiment of FIGS. 1–3, the seal 42 includes two O-rings made of nitrile elastomer separated by a center O-ring made of a polymer of a different hardness than the two O-rings between which it is sandwiched.

The assembly 10 includes a quick connect member having a support portion 44 having an aperture 46 surrounding the tube 34 and in sliding engagement with the tube 34. The quick connect member includes a pair of arms with each arm extending axially along the tube 34 from the support portion 44 to an abutment 48 biased radially outwardly into a locked position in radial overlapping engagement with the shoulder and moveable radially inwardly to a release position wherein the abutment 48 clears the shoulder to axially remove the quick connect member from the socket. That is, the abutment 48 clears the inner tip of the conical surface 28 of the flange 18 when in the release position.

The quick connect member is characterized by the abutment 48 having a tip 50 at the radially outward extremity and a trough 52 at the radially inward extremity. The quick connect member presents a forward extremity, defined by the support portion 44 which is disposed within and no further forward than the plane of the forward extremity in the embodiment of FIGS. 1–3, for applying a retention force to the projection 38 in a radial plane and each of the arms includes a flared length 54 slanting radially outwardly and axially rearwardly immediately from the radial plane at the forward extremity to the tip 50. Each of the arms extends downwardly from the tip 50 through the abutment 48 to the trough 52. Thereafter, each of the arms includes a lever length 56 extending from the trough 52 radially upwardly and outwardly and finger 58 extending axially from the lever length 56. The lever length 56 of each of the arms is disposed in the space provided by the conical relief 20 whereas the flared length 54 is disposed in the space provided by the conical surface 28.

To enhance security, a blocking element is disposed under the arms for preventing the abutments 48 from moving to the release position. In the embodiment of FIGS. 1–3, the blocking element comprises a ring 60 disposed between the tube 34 and the troughs 52 of the arms. In this manner, the fingers 58 cannot be moved inwardly sufficiently to remove the abutment 48 out of engagement with the flange 18.

Figure 4:
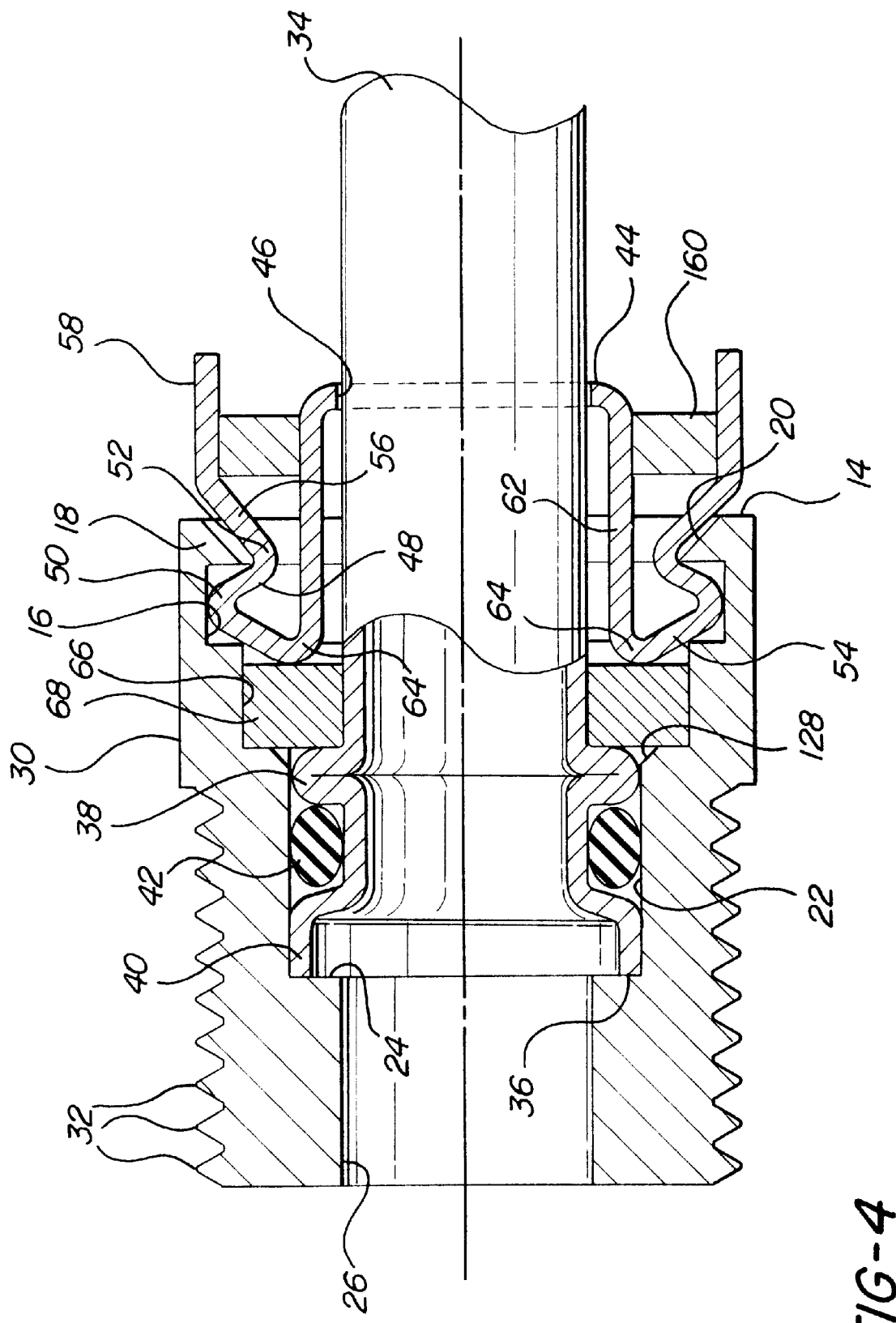
FIG. 4 is a fragmentary cross sectional view of a second preferred embodiment of the subject invention.

The second embodiment of FIG. 4 differs from the that of FIGS. 1–3 only in that the support portion 44 is spaced axially from the plane of the forward extremity and each of the arms includes a connector length 62 extending between the support portion 44 and the forward extremity. In this case, the forward extremity is defined by the bend 64 of more than ninety degrees from the flared length 54 to the connector length 62.

Another difference in FIG. 4 is that a blocking element or ring 160 is disposed between the fingers 58 and the connector lengths 62 for preventing the abutments 48 from moving to the release position.

Further, the socket member 12 includes an intermediate bore 66 having a diameter larger than the counterbore 22 and smaller than the annular groove 16 with a spacer ring 68 being disposed in the intermediate bore 66. A chamber 128 interconnects the bores 66 and 22. The spacer ring 68 is disposed between the projection 38 and the forward extremity or bend 64 for transmitting forces from the forward extremity 64 to the projection 38.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A quick connect member for connecting a tube (34) to a socket member (12) and comprising;

a support portion (44) for surrounding and sliding engagement with a tube (34);

a pair of arms for extending axially along the tube (34) from said support portion (44) to an abutment (48) biased radially outwardly into a locked position in radial overlapping engagement with a shoulder in the socket member (12) and moveable radially inwardly to a release position wherein said abutment (48) clears the shoulder to axially remove said quick connect member from the socket member (12), said quick connect member characterized by said abutment (48) having a tip (50) at the radially outward extremity and a trough (52) at the radially inward extremity, said quick connect member presenting a forward extremity for applying an axial retention force forwardly of a radial plane at said forward extremity, said support portion (44) being disposed no further forward than said radial plane of said forward extremity, each of said arms including a flared length (54) slanting radially outwardly and axially rearwardly immediately from said radial plane at said forward extremity to said tip (50), each of said arms extending downwardly through said abutment (48) to said trough (52), each of said arms including a lever length (56) extending from said trough (52) radially upwardly and outwardly and finger (58) extending axially from said lever length (56).

2. A quick connect member as set forth in claim 1 wherein said support portion (44) is disposed in said radial plane of said forward extremity.

3. A quick connect member as set forth in claim 1 wherein said support portion (44) is spaced axially from said radial plane of said forward extremity and each of said arms includes a connector length (62) extending between said support portion (44) and said forward extremity.

* * * * *